US011222283B2

(12) United States Patent
Jiang et al.

(10) Patent No.: US 11,222,283 B2
(45) Date of Patent: Jan. 11, 2022

(54) HIERARCHICAL CONVERSATIONAL POLICY LEARNING FOR SALES STRATEGY PLANNING

(71) Applicant: INTERNATIONAL BUSINESS MACHINES CORPORATION, Armonk, NY (US)

(72) Inventors: Zhuoxuan Jiang, Shanghai (CN); Jie Ma, Nanjing (CN); Ya Bin Dang, Beijing (CN); Jian Wang, Beijing (CN); Qi Cheng Li, Beijing (CN); Li Jun Mei, Beijing (CN); Xin Zhou, Beijing (CN); Hao Chen, Beijing (CN); Yi Peng Yu, Beijing (CN); Shao Chun Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 615 days.

(21) Appl. No.: 16/168,031

(22) Filed: Oct. 23, 2018

(65) Prior Publication Data
US 2020/0125997 A1 Apr. 23, 2020

(51) Int. Cl.
*G06Q 30/02* (2012.01)
*G06N 20/00* (2019.01)
(Continued)

(52) U.S. Cl.
CPC ......... *G06N 20/00* (2019.01); *G06Q 10/0637* (2013.01); *G10L 15/18* (2013.01)

(58) Field of Classification Search
CPC .................................................... G06Q 30/02
See application file for complete search history.

(56) References Cited

U.S. PATENT DOCUMENTS 7,725,322 B2   5/2010   Kwak et al.
9,230,544 B2   1/2016   Kwon et al.
(Continued)

FOREIGN PATENT DOCUMENTS

| CN | 106573375 A | * | 4/2017 | ............... B25J 9/16 |
| JP | 2003-50559 A | * | 2/2003 | ............... B25J 5/00 |
| JP | 2005-172879 A | * | 6/2005 | ............... B25J 5/00 |

OTHER PUBLICATIONS

Joanna Henzel; Marek Sikora, Gradient Boosting Application in Forecasting of Performance Indicators Values for Measuring the Efficiency of Promotions in FMCG Retail (English), 2020 15th Conference on Compter Sceince and Information Systems (FedCSIS) (pp. 59-68), Sep. 1, 2020 (Year: 2020).*

(Continued)

*Primary Examiner* — Marilyn G Macasiano
(74) *Attorney, Agent, or Firm* — Tutunjian & Bitetto, P.C.; Joseph Petrokaitis

(57) ABSTRACT

A computer-implemented method is presented for enabling hierarchical conversational policy learning for sales strategy planning. The method includes enabling a user to have a conversation with a robot via a conversation platform, employing a plan database to store general plans used in the conversation, employing an industry database to store a plurality of candidate plans pertaining to sales promotions, and employing a plan and policy optimizer to allow the robot to select and output an optimal plan from the plurality of candidate plans, the optimal plan determined by hierarchical reinforcement learning via a first learner and a second learner, the first leaner selecting the optimal plan and the second learner selecting an optimal action.

20 Claims, 6 Drawing Sheets

(51) Int. Cl.
  *G10L 15/18* (2013.01)
  *G06Q 10/06* (2012.01)

(56) References Cited

U.S. PATENT DOCUMENTS

| | | | |
|---|---|---|---|
| 9,378,607 B1 * | 6/2016 | Wine | B65G 1/1373 |
| 9,530,412 B2 | 12/2016 | Selfridge | |
| 9,576,579 B1 | 2/2017 | Witt-Ehsani | |
| 9,767,794 B2 | 9/2017 | Vibbert et al. | |
| 9,812,127 B1 | 11/2017 | Perez et al. | |
| 9,865,257 B2 | 1/2018 | Wang et al. | |
| 9,871,927 B2 | 1/2018 | Perez et al. | |
| 10,630,838 B2 * | 4/2020 | McGann | H04M 3/493 |
| 10,642,281 B2 * | 5/2020 | Maruo | G05D 1/0282 |
| 2004/0249638 A1 | 12/2004 | Wang | |
| 2011/0153322 A1 | 6/2011 | Kwak et al. | |
| 2017/0352347 A1 | 12/2017 | Sharma et al. | |

OTHER PUBLICATIONS

D. Nakagawa; H. Akutsu; N. Furuta; K. Yasuda; K. Takahashi; M. Watase; S. Nakagawa; M. Narita, Marketing system utilizing a robot and smartphone (English), 2015 IEEE/SICE International Symposium on System Integration (SIL) (pp. 662-667), -Oct. 1, 2015 (Year: 2015).*

Chen et al., "Deep Learning for Dialogue Systems", Coling 2018 Tutorial, deepdialogue.miulab.tw. Nov. 15, 2016. pp. 1-157.

Celikyilmaz et al., "Deep Reinforcement Learning for Goal-Oriented Dialogues", Microsoft.com. https://www.microsoft.com/en-us/research/project/deep-reinforcement-learning-goal-oriented-dialogues/. Apr. 18, 2016. pp. 1-4.

Cuayahuitl et al., "Evaluation of a heirarchical reinforcement learning spoken dialogue system", Science Direct. vol. 24, Issue Apr. 2, 2012. pp. 1-2.

Cuayahuitl et al., "Hierarchical Reinforcement Learning for Spoken Dialogue Systems", The University of Edinburgh. Edinburgh Research Archive. Informatics thesis and dissertation collection. Jan. 2009. Abstract. p. 1.

Dethlefs et al., "Hierarchical reinforcement learning and hidden Markov models for task-oriented natural language generation", Proceedings of the 49th Annual Meeting of the Association for Computational Linguistics: Human anguage Technologies: short papers—vol. 2. Abstract. Jun. 19-24, 2011. p. 1.

Noseworthy et al., "Predicting Success in Goal-Driven Human-Human Dialogues", Association for Computational Linguistics. Proceedings of the 18th Annual SIGDIAL 2017 Conference. Aug. 15-17, 2017. pp. 253-262.

* cited by examiner

HIERARCHICAL CONVERSATIONAL POLICY LEARNING FOR SALES STRATEGY PLANNING

BACKGROUND

Technical Field

The present invention relates generally to task-oriented dialogue systems, and more specifically, to hierarchical conversational policy learning for sales strategy planning.

Description of the Related Art

Statistical modeling methods that rely on learning from data rather than hand-crafted rules have become the preferred approach for the development of sophisticated automated speech recognition systems. These methods led to automated speech recognition (ASR) technology that is widely used in everyday applications. In recent years, the use of this methodology has been extended from acoustic and language models to other components of a spoken dialog system (SDS), including spoken language understanding, semantic classification, and dialog management. Some of the components, such as, for example, a semantic classifier for call routing applications, matured beyond research and are now deployed in commercial applications.

SUMMARY

In accordance with an embodiment, a method is provided for enabling hierarchical conversational policy learning for sales strategy planning. The method includes enabling a user to have a conversation with a robot via a conversation platform, employing a plan database to store general plans used in the conversation, employing an industry database to store a plurality of candidate plans pertaining to sales promotions, and employing a plan and policy optimizer to allow the robot to select and output an optimal plan from the plurality of candidate plans, the optimal plan determined by hierarchical reinforcement learning via a first learner and a second learner, the first leaner selecting the optimal plan and the second learner selecting an optimal action.

In accordance with another embodiment, a system is provided for enabling hierarchical conversational policy learning for sales strategy planning. The system includes a memory and one or more processors in communication with the memory configured to enable a user to have a conversation with a robot via a conversation platform, employ a plan database to store general plans used in the conversation, employ an industry database to store a plurality of candidate plans pertaining to sales promotions, and employ a plan and policy optimizer to allow the robot to select and output an optimal plan from the plurality of candidate plans, the optimal plan determined by hierarchical reinforcement learning via a first learner and a second learner, the first leaner selecting the optimal plan and the second learner selecting an optimal action.

In accordance with yet another embodiment, a non-transitory computer-readable storage medium comprising a computer-readable program for enabling hierarchical conversational policy learning for sales strategy planning is presented. The non-transitory computer-readable storage medium performs the steps of enabling a user to have a conversation with a robot via a conversation platform, employing a plan database to store general plans used in the conversation, employing an industry database to store a plurality of candidate plans pertaining to sales promotions, and employing a plan and policy optimizer to allow the robot to select and output an optimal plan from the plurality of candidate plans, the optimal plan determined by hierarchical reinforcement learning via a first learner and a second learner, the first leaner selecting the optimal plan and the second learner selecting an optimal action.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
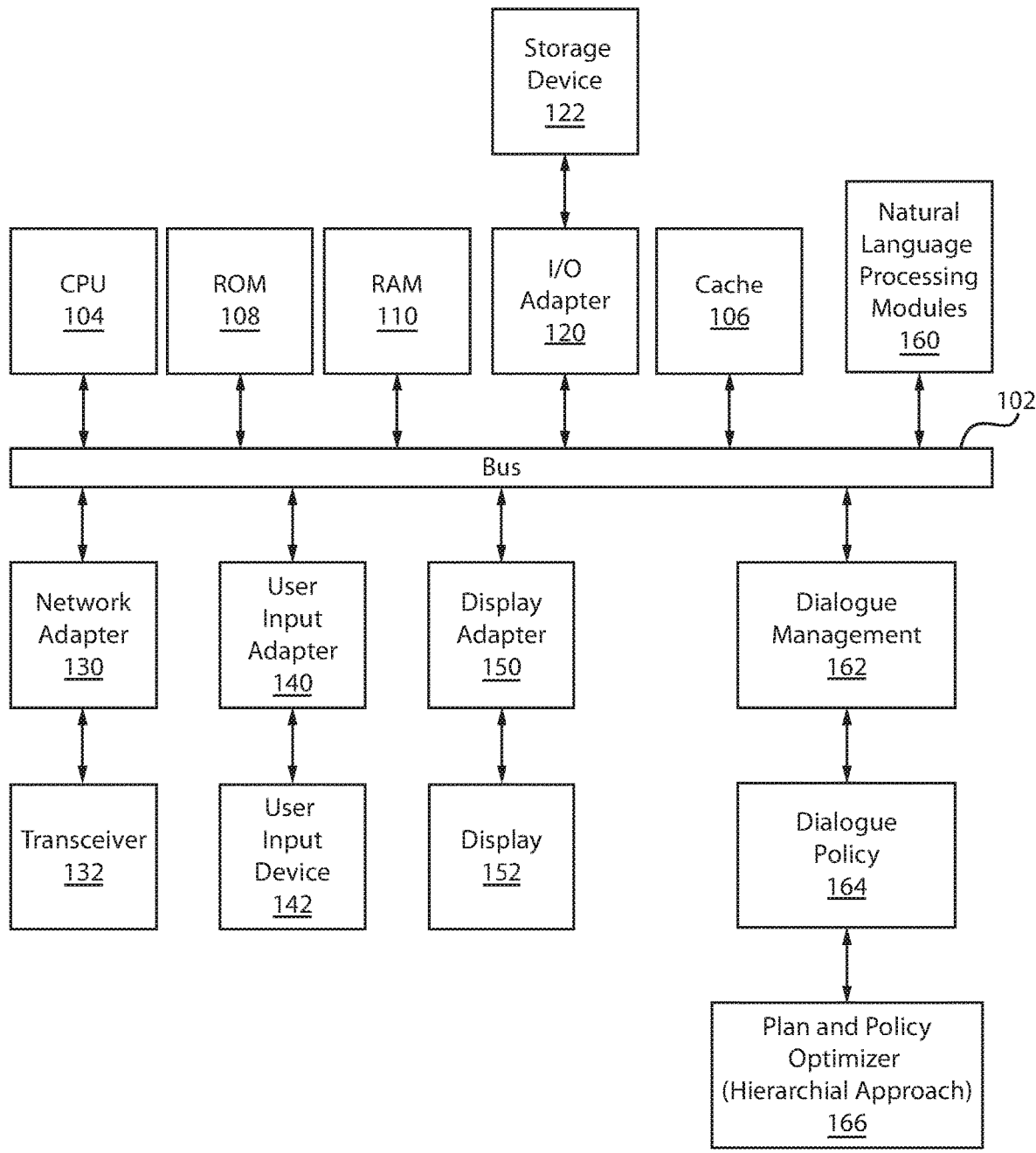
FIG. 1 is an exemplary processing system for a task-oriented dialogue system, in accordance with embodiments of the present invention.

Embodiments in accordance with the present invention provide methods and devices for implementing artificial intelligence in conversation understanding systems. In general, computer solutions, and in particular algorithms and processes known as artificial intelligence, are in use to an ever increasing extent by companies wishing to communicate with clients or customers. The main benefit is that the cost of implementing an artificial intelligence solution is a fraction of the cost of employing people to perform the same role.

Conversational understanding (CU) systems are used for a variety of different applications. For example, CU systems have been developed to allow users to search for content, buy items, obtain directions, and the like. The CU development process uses experts, such as scientists and computational linguists, in each step of the CU building process. For example, experts are used in the labeling of the data used when creating a CU application. CU systems can process dialogue between a user and a robot or agent. Dialogue systems can be classified as non-task dialogue systems and task-oriented dialogue systems. A task-oriented dialogue system can be beneficial in pre-sales consultation and promotion, after-sales services, task management, etc. Dialogue policy is important to a task-oriented dialogue system.

Embodiments in accordance with the present invention provide methods and devices for implementing a goal-driven dialogue system, which highlights the initiative from a robot's side during conversation in, e.g., business scenarios, such as sales promotions. Dialogue policy is also important to a goal-driven dialogue system because the robot needs to make decisions based on a human's responses, instead of just executing a human's instructions. The exemplary embodiments of the present invention determine how a robot can determine an optimal path during conversation in order to efficiently reach one or more predefined sales or product promotion goals.

For a goal-driven dialogue system, conventional solutions usually predefine every possible situation into a path, and all the paths constitute a large static tree. However, there are drawbacks to such an approach. For instance, the policies used in dialogue are based on very complex rules and without high-level thinking, e.g., planning and finding an optimal path to a goal, and some sales strategies or policies, which are commonly used in face-to-face situation between humans, cannot be employed in human-robot dialogues. As such, the exemplary embodiments of the present invention enable a robot to make plans of how to promote a product in sales promotion situations. First, the exemplary system includes at least four components, which can ensure the logic of a conversation. These components can be: a plan database (DB) and an industry DB that store the basic discourse fragments, which correspond to one-turn low-level dialogue, a plan and policy management module, which stores several sets of discourse fragments that correspond to multi-turn dialogue of high-level plans, a plan and policy optimizer for choosing the optimal plans and optimal actions, and an executor module for executing plans and actions based on an existing conversation platform. The plan and policy optimizer includes a hierarchical reinforcement learning method through two learners, which can choose the optimal plan and optimal action, respectively.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is an exemplary processing system for a task-oriented dialogue system, in accordance with embodiments of the present invention.

The processing system includes at least one processor (CPU) 104 operatively coupled to other components via a system bus 102. A cache 106, a Read Only Memory (ROM) 108, a Random Access Memory (RAM) 110, an input/output (I/O) adapter 120, a network adapter 130, a user interface adapter 140, and a display adapter 150, are operatively coupled to the system bus 102. Moreover, natural language processing modules 160 can be connected to bus 102 to enable dialogue management 162, which includes dialogue policy 164. The dialogue policy 164 can be optimized by a plan and policy optimizer 166 via, e.g., a two-level hierarchical approach.

A storage device 122 is operatively coupled to system bus 102 by the I/O adapter 120. The storage device 122 can be any of a disk storage device (e.g., a magnetic or optical disk storage device), a solid state magnetic device, and so forth.

A transceiver 132 is operatively coupled to system bus 102 by network adapter 130.

User input devices 142 are operatively coupled to system bus 102 by user interface adapter 140. The user input devices 142 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 142 can be the same type of user input device or different types of user input devices. The user input devices 142 are used to input and output information to and from the processing system.

A display device 152 is operatively coupled to system bus 102 by display adapter 150.

Of course, the processing system for sales promotions can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system for sales promotions are readily contemplated by one of ordinary skill in the art given the teachings of the present invention provided herein.

Figure 2:
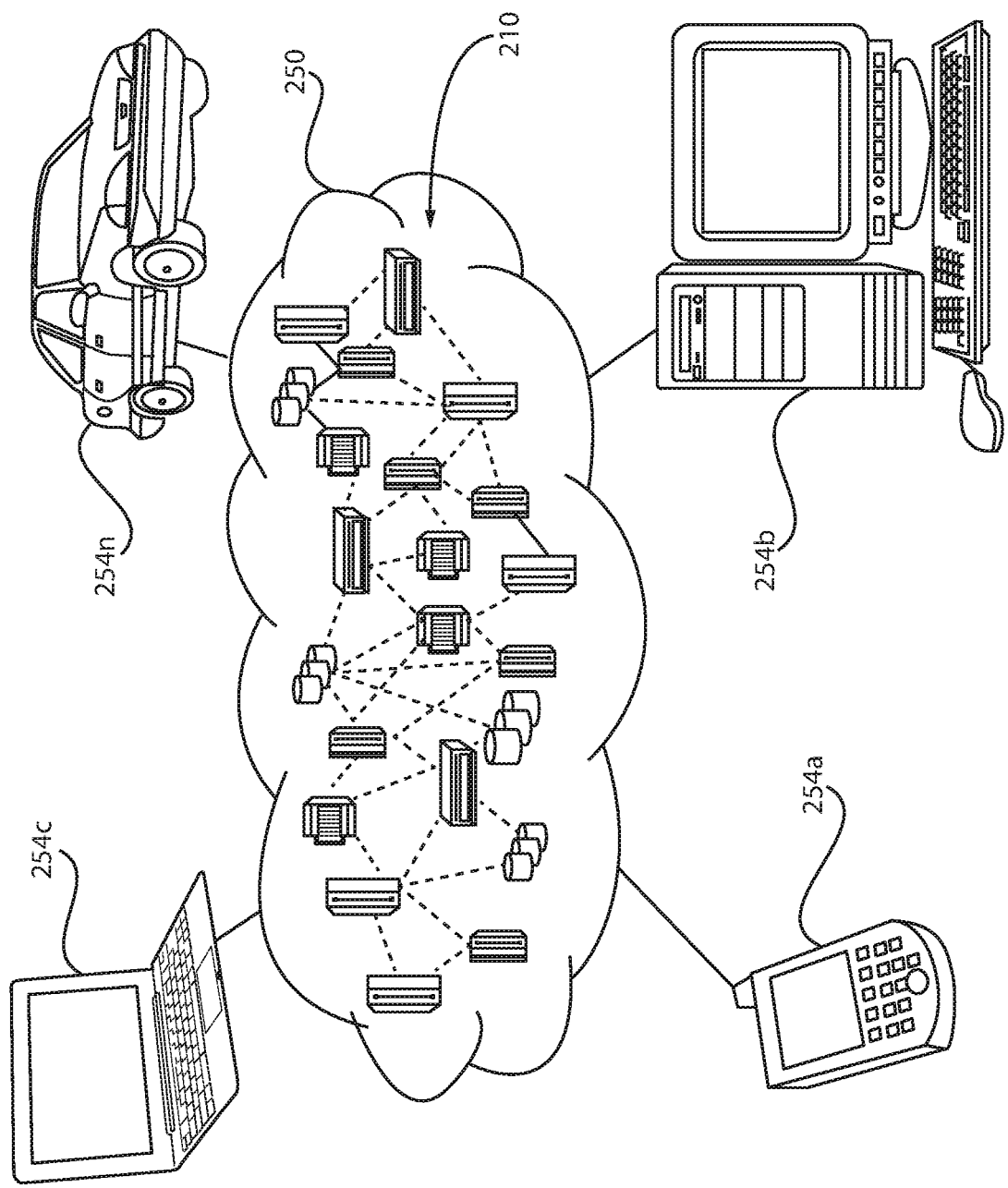
FIG. 2 is a block/flow diagram of an exemplary cloud computing environment, in accordance with an embodiment of the present invention.

FIG. 2 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 250 is depicted for enabling use cases of the present invention. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N can communicate. Nodes 210 can communicate with one another. They can be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
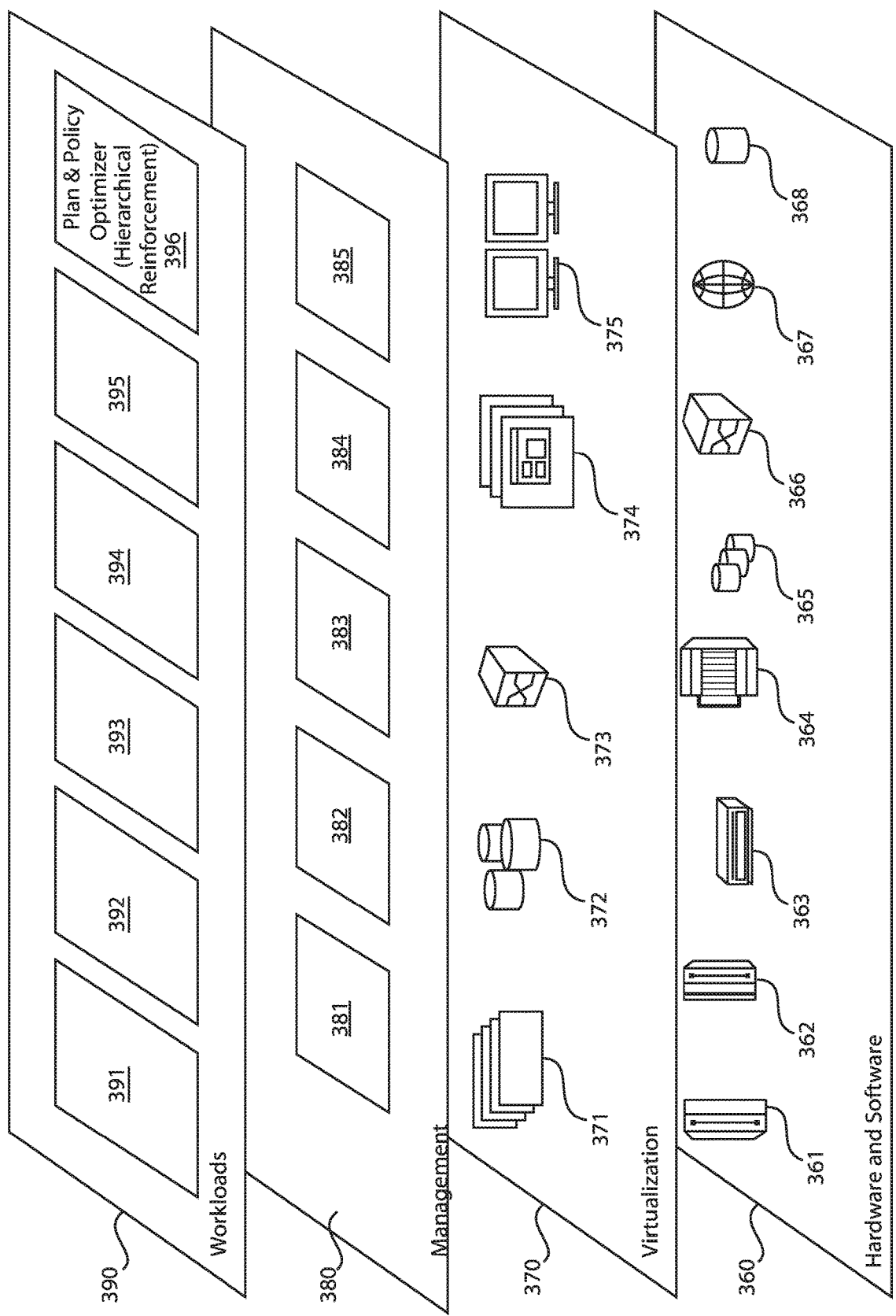
FIG. 3 is a schematic diagram of exemplary abstraction model layers, in accordance with an embodiment of the present invention.

FIG. 3 is a schematic diagram of exemplary abstraction model layers, in accordance with an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities can be provided: virtual servers 371; virtual storage 372; virtual networks 373, including virtual private networks; virtual applications and operating systems 374; and virtual clients 375.

In one example, management layer 380 can provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment can be utilized. Examples of workloads and functions which can be provided from this layer include: mapping and navigation 391; software development and lifecycle management 392; virtual classroom education delivery 393; data analytics processing 394; transaction processing 395; and a plan and policy optimizer 396.

Figure 4:
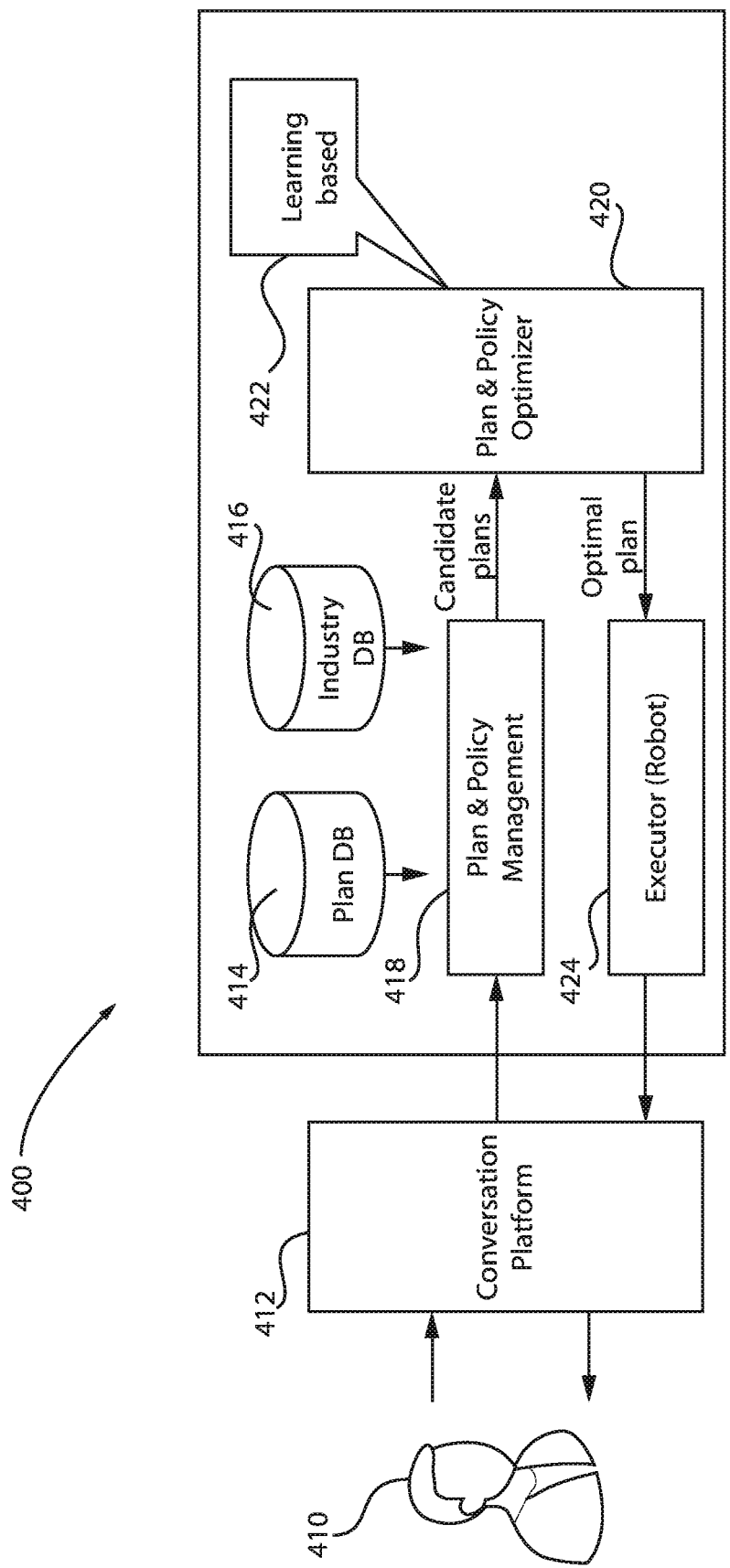
FIG. 4 is a block/flow diagram of an example system architecture for pre-sales promotion dialogue, in accordance with an embodiment of the present invention.

FIG. 4 is a block/flow diagram of an example system architecture for pre-sales promotion dialogue, in accordance with an embodiment of the present invention.

The system architecture 400 includes one or more users 410 that communicate via a conversation platform 412 with a robot or agent 424. The user 410 can start a conversation that is received by the conversation platform 412.

Regarding a plan, to a task-oriented dialogue system for sales, usually there is a goal, such as promotion of some product and making a deal. In order to complete the task, there are usually several different sequential steps to reach such promotion or sales goals. Thus, based on each current conversation, the exemplary embodiments can generate an optimal path towards such goals, which pertains to high-level decision making.

Regarding policy, based on each current conversation, existing or conventional systems can only decide one next step, which is usually based on pre-defined rules for state transitions. In contrast, the exemplary embodiments of the present invention employ policy that is hierarchical. In one example, there is a plan decision and an action decision.

Regarding the conversation platform 412, this can be a general natural language processing (NLP) module, which is responsible for handling the interaction with the users 410. This component can include methods of Speech Recognition, Natural Language Understanding (NLU), Natural Language Generation (NLP) and other NLP methods.

Regarding the plan database (DB) 414, this can be a database which stores general plans used in dialogue, such as "Inform," "Request," or "Confirm" something.

Regarding industry database (DB) 416, this can be a database which stores a specific plan for specific sales, e.g., if selling financial products, the preference of investment capital, duration and risk tolerance, and special sales policy should be stored.

Regarding the Plan & Policy Management module 418, the module 418 combines the two DBs' information, from which the exemplary methods can obtain and generate several candidate dialogue plans.

Regarding the Plan & Policy Optimizer module 420, module 420 can output the optimal plan from many candidate plans as input. Initially, the criteria to choose an optimal plan relies on, e.g., pre-defined cost values. After deploying the exemplary system, the exemplary system can adjust the cost values for each plan by reinforcement learning via a learning module 422. If no plan is found, an action (e.g., degraded plan with one step) can be outputted.

Regarding the Executor module 424, concerning obtaining the optimal plan from the previous module 420, the executor module 424 can execute the plan by sending instructions to the conversation platform 412 to say something. The executor 424 can be a robot or robotic system.

Therefore, when the robot 424 receives a response from a user 410, the robot 424 should decide what contents to say. The exemplary embodiments accomplish this process by employing hierarchical policies for finding an optimal plan to act on. The exemplary embodiments provide the robot 424 with high-level decision making capabilities by enabling the robot 424 to dynamically and intelligently choose plans from knowledge databases. The robot 424 can learn from historical dialogue records by, e.g., reinforcement learning methods. The robot 424 determines optimal paths to find the optimal plan. A series of steps can constitute an optimal path. The optimal path can be the path involving the least amount of steps to reach the optimal plan.

Figure 5:
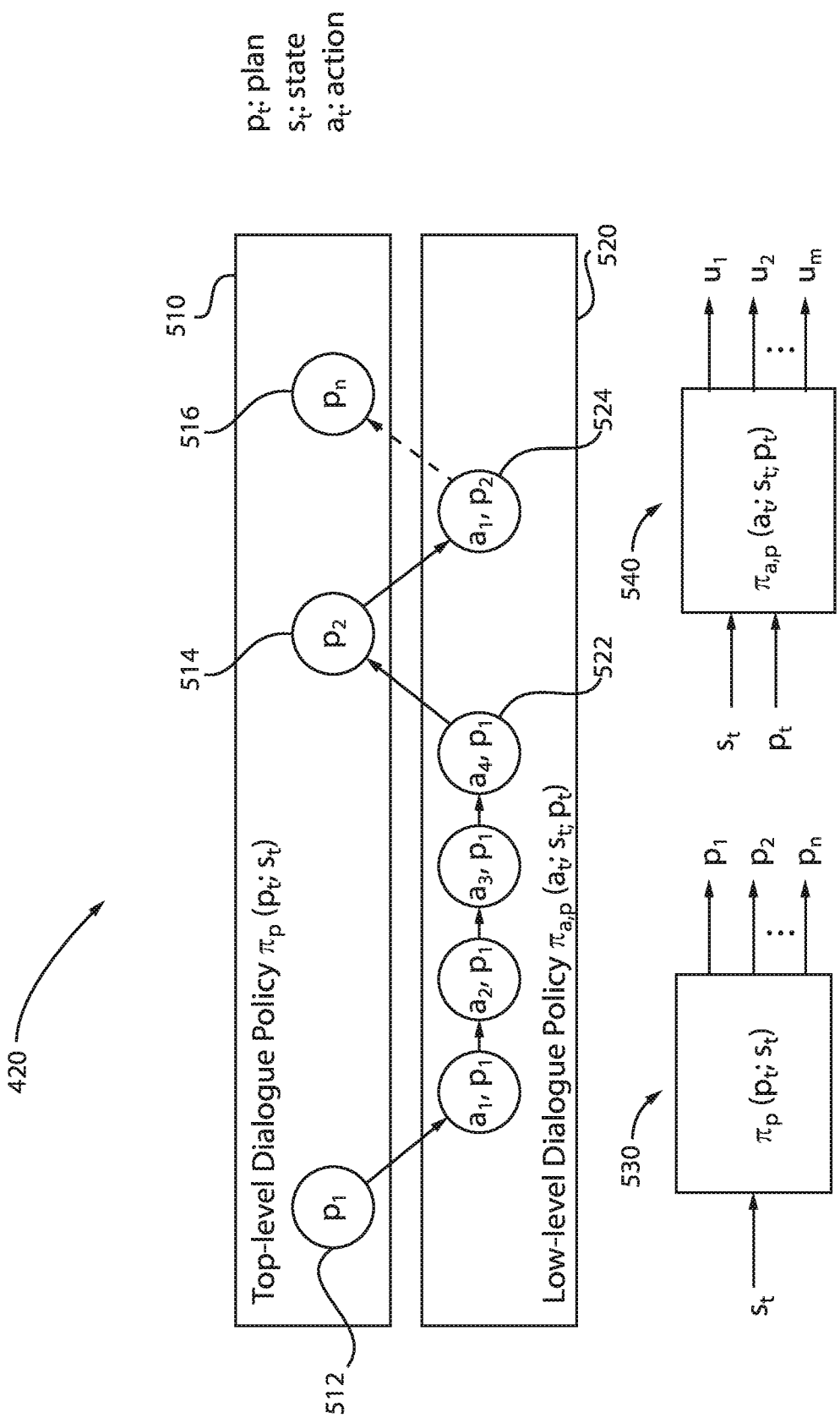
FIG. 5 is a block/flow diagram of an example system of a plan and policy optimizer, in accordance with an embodiment of the present invention.

FIG. 5 is a block/flow diagram of an example system of a plan and policy optimizer, in accordance with an embodiment of the present invention.

The plan and policy optimizer 420 includes a first learner 510 and a second learner 520.

The first leaner 510 is responsible for choosing the optimal policy (e.g. a plan with several steps to complete a sub-task), which includes a series of actions, and in the low-level, the second learner 520 chooses or selects the optimal utterance for each action. The relationship between a policy and a series of actions is predefined in the plan DB 414 and managed by Plan & Policy Management module 418. The two learners 510, 520 share some inputs and parameters, but are trained separately. The top learner 510 includes plans 512, 514, 516, whereas the lower learner 520 includes actions 522, 524 of plans. Reinforcement learning involves an agent, a set of states, and a set of actions per state. By performing an action, the agent transitions from state to state. Executing an action in a specific state provides the agent with a reward (a numerical score). The goal of the agent is to maximize its total (future) reward. "Q" names the function that returns the reward used to provide the reinforcement and can be said to stand for the "quality" of an action taken in a given state.

For example, the agent or robot receives a user's sentence. Then the top-lever learner 510 chooses the optimal plan from plan DB 414. The selected plan includes several pre-defined actions. Then starting from the first action, the agent uses the low-level optimizer or learner 520 to generate the optimal utterance and says it to user 410. Then in a new dialogue turn, the agent decides whether to continue the same plan or start from a new plan. If in the loop of the same plan, the second action is executed to generate an utterance, otherwise the first action of a new plan is executed. The two optimizers 510, 520 are trained by basic reinforcement learning in actual use. Thus, the exemplary embodiments introduce a two-level hierarchy to choose a best or preferred plan and then choose a best utterance for the sales domain by leveraging reinforcement learning. Moreover, the first and second learners 510, 520 not only learn to arrange an order of plans, but also learn how to arrange the steps in each plan.

Elements 530 and 540 are two functions which can output the probability of each plan and each utterance, respectively. The two functions are basic expressions of Q-table reinforcement learning methods. Q-learning is a reinforcement learning technique used in machine learning. The goal of Q-learning is to learn a policy, which tells an agent what action to take under what circumstances. Q-learning does not require a model of the environment and can handle problems with stochastic transitions and rewards, without requiring adaptations.

Therefore, the exemplary embodiments of the present invention include at least the following advantages:

A sales goal-driven dialogue, where the exemplary methods and systems can find an optimal sales policy and plan the paths in a dialogue in order to reach sales goals.

A method of hierarchical planning, where the exemplary methods and systems can reduce the search space to a low-dimension and integrate the sales process with policies into a high-level plan (decision making), which can greatly increase the system's flexibility.

The introduction of cost calculation, which enables the methods and systems how to quantify a dialogue, specifically for a goal, e.g., a sales goal. The task is to enable the robot or agent to plan an optimal path to dialog with humans in order to achieve, e.g., sales goals. Thus, the task pertains to sales conversations and the robot has a specific goal that it needs to achieve. The robot chooses or selects the optimal solution every single time by executing the smallest or least number of turns in a dialogue process. The policies of planning and actions are learned by a two-level hierarchical method. The hierarchical method pertains to plans and actions.

The use of reinforcement learning is advantageous, so that the framework can be continuously optimized in practical use. Additionally, the learners can find unknown paths which are human-agnostic in conventional sales.

Moreover, the exemplary embodiments of the present invention provide for a fast way to integrate plan knowledge and industry knowledge to the system in the form of script, and the system can dynamically and intelligently choose plans from the knowledge. By substantial testing, in most cases the system can usually find an optimal path to drive the conversation towards one or more sales goals. For example, the system can dynamically identify strategic combination of policies (e.g., a high-level plan) for different users with different preferences. In conclusion, the exemplary embodiments of the present invention enable a dialogue robot with a capability of making high-level strategic decisions, enable using a planning approach towards one or more sales goals, and enable a different and novel approach to integrate industry knowledge with dialogue policy. The main part of the system, the plan and policy optimizer, can learn from practical use and learn to better achieve the one or more sales goals.

Figure 6:
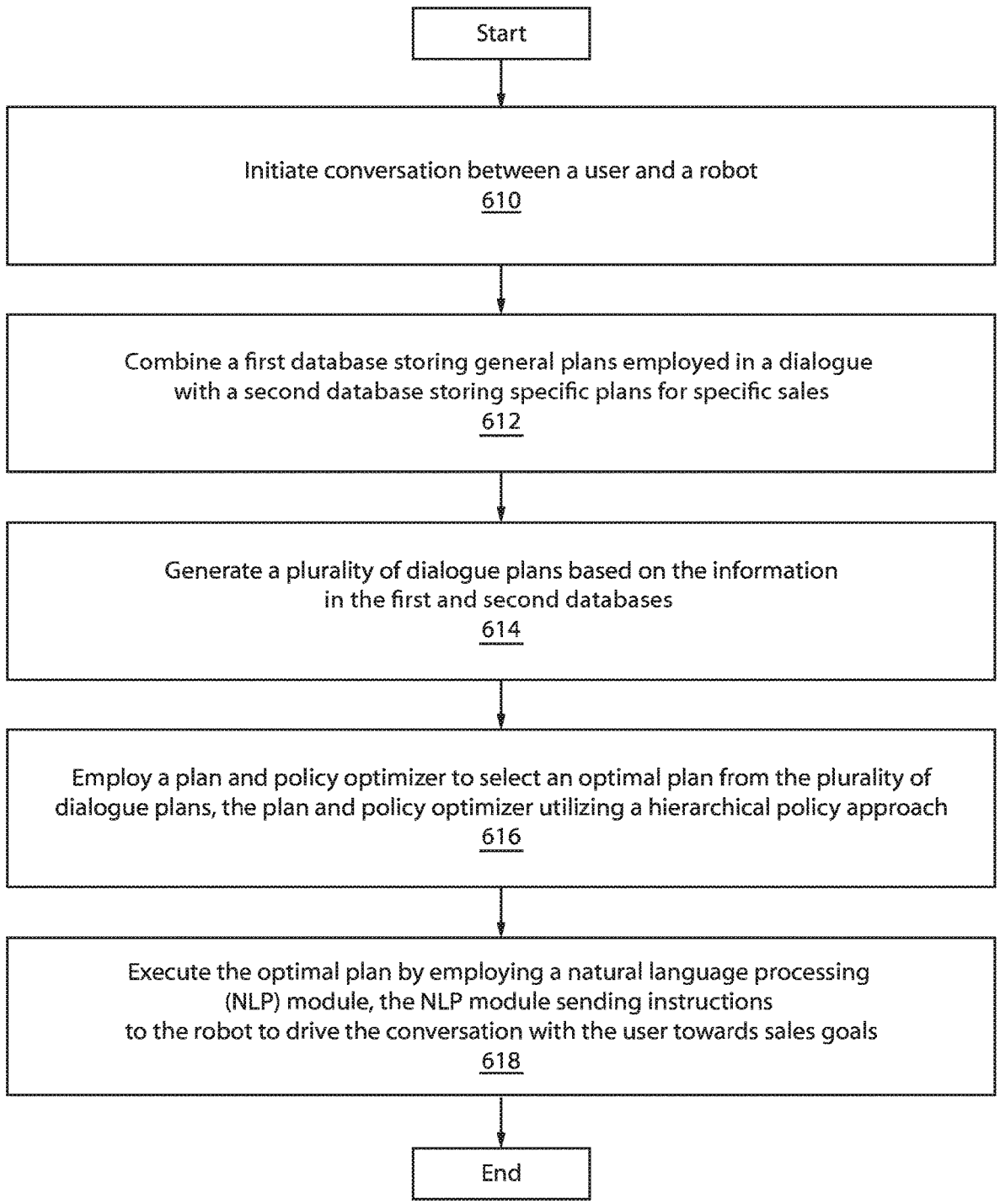
FIG. 6 is a block/flow diagram illustrating a method for determining an optimal path during conversation for reaching a predefined goal, in accordance with an embodiment of the present invention.

FIG. 6 is a block/flow diagram illustrating a method for determining an optimal path during conversation for reaching a predefined goal, in accordance with an embodiment of the present invention.

At block 610, a conversation is initiated between a user and a robot. The conversation can be executed on a conversation platform.

At block 612, a first database storing general plans employed in a dialogue or conversation is combined with a second database storing specific plans for specific sales. The first database is a plan database and the second database is an industry database.

At block 614, a plurality of candidate dialogue plans are generated based on the information in the first and second databases.

At block 616, a plan and policy optimizer is employed to select an optimal plan from the plurality of dialogue plans, the plan and policy optimizer utilizing a hierarchical policy approach. The plan and policy optimizer can use a first learner and a second learner.

At block 618, the optimal plan is executed by employing a natural language processing (NLP) module, the NLP module sending instructions to the robot to drive the conversation with the user towards sales goals.

In general, the exemplary embodiments of the present invention can be applied to deep neural networks. Deep neural network structures can be part of an artificial intelligence module. The artificial intelligence module for example includes an artificial intelligence engine having the functions of: natural language interaction, allowing spoken or written natural language received from a user to be interpreted, and natural language responses to be generated; a dynamic decision module corresponding to the function of making decisions, based on rules, on how to respond to user queries; an interaction memory, storing a history of interactions between a user and a live agent/virtual assistant, for example including messages sent to and from the user; and a behavior analysis function, which can include an algorithm for detecting certain aspects of the interaction with the user, such as emotion, which could indicate when a customer is not satisfied. Thus, a machine learning component can be employed to optimize the deep neural networks based on a plan and policy optimizer employed to determine a preferred or best or optimal plan to be selected or chosen by a robot.

As a broad subfield of artificial intelligence, machine learning is concerned with the design and development of algorithms and techniques that allow computers to "learn." At a general level, there are two types of learning: inductive, and deductive. Inductive machine learning methods extract rules and patterns out of massive data sets. The major focus of machine learning research is to extract information from data automatically by computational and statistical methods, hence, machine learning is closely related to data mining and statistics. Embodiments of machine learning can appear in "supervised adaption" and "adaption of algorithms" to evaluate agent performance and assign a score to each agent based on prior performance.

An agent can be selected based on a skill set or expertise of the agent, as well as other factors such as geographic location, of the agent. The term "agent," "specialist," or "expert" refers to a service center personnel or a computerized application or robot, in some cases, that respond to customer requests. An agent can be locally situated at the service center or remotely situated over a network. Throughout this application, the terms of "agent," "specialist," "robot," and "expert" are interchangeable terms dependent upon the circumstances. In most cases, the term of "agent" collectively refers to a customer representative, a support agent, a support specialist, a support expert, a robot, or a combination thereof, which can be a service center personnel and/or a computerized application.

A service center can be implemented in a centralized facility or server. Alternatively, a service center can be implemented in multiple facilities or servers in a distributed manner (e.g., cloud-based service platforms). A service center can provide services to a variety of products or services from a variety of clients or vendors. A client can be a manufacturer, a distributor, a retailer, a service provider or broker, a purchasing facility or a combination thereof. In one embodiment, a service center can include service APIs to communicate with other systems such as mobile devices, client sites, social communities, contact centers including agents or experts, client backend systems, manufacturer backend systems, eCommerce sites and other auxiliary systems (e.g., billing system). A service center can handle service requests from customers of multiple clients.

Note that a service center described throughout this application is not limited to a conventional service center or support center, nor is it implemented in a single physical location. A service center described herein represents a collection of service logic or providers communicatively coupled to each other over a network in a distributed or a cloud-based fashion. The term of a service center herein represents any kind of service providers that provide a variety of services to customers or users. The service center can include a plurality of robots or robotic systems that handle requests or queries from one or more users.

In one embodiment, the service center further includes a multi-channel communication and routing system to provide one or more communication channels to any user or client to concurrently access the service center. Examples of communication channels include email, chat, texting (e.g., short messaging services or SMS), voice (e.g., automated IVR, real-time, or VoIP), video, Web (e.g., Web conferencing), and/or online community forum (e.g., Facebook™ or Twitter™), etc. Note that the multi-channel communication and routing system can be fully or partially integrated with the service center or alternatively, it can be maintained or provided by a third party or partner (e.g., communicatively coupled via service API over a network).

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for hierarchical conversational policy learning for sales strategy planning (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed on a processor for enabling hierarchical conversational policy learning for sales strategy planning, the computer-implemented method comprising:
    enabling a user to have a conversation with a robot via a conversation platform;
    employing a plan database to store general plans used in the conversation;
    employing an industry database to store a plurality of candidate plans pertaining to sales promotions; and
    employing a plan and policy optimizer to enable the robot to dynamically select and output an optimal plan from the plurality of candidate plans to dynamically reach predefined sales or product promotion goals, the optimal plan determined by hierarchical reinforcement learning via a first learner and a second learner, the first leaner selecting the optimal plan and the second learner selecting an optimal action.

2. The method of claim 1, wherein the conversation platform includes a natural language processing (NLP) module.

3. The method of claim 1, wherein a plan and policy management module combines information from the plan database and the industry database to generate the plurality of candidate plans.

4. The method of claim 1, wherein an executor module executes plans and actions to trigger the conversation platform to send the optimal plan to the user.

5. The method of claim 1, wherein a criterion for selecting the optimal plan includes predefined cost values.

6. The method of claim 5, wherein the predefined cost values are adjusted for each of the plurality of candidate plans by the hierarchical reinforcement learning.

7. The method of claim 1, wherein the robot determines an optimal path that leads to the selection of the optimal plan from the plurality of candidate plans maximizing a predefined sales goal.

8. A non-transitory computer-readable storage medium comprising a computer-readable program executed on a processor in a data processing system for enabling hierarchical conversational policy learning for sales strategy planning, wherein the computer-readable program when executed on the processor causes a computer to perform the steps of:
    enabling a user to have a conversation with a robot via a conversation platform;
    employing a plan database to store general plans used in the conversation;
    employing an industry database to store a plurality of candidate plans pertaining to sales promotions; and
    employing a plan and policy optimizer to enable the robot to dynamically select and output an optimal plan from the plurality of candidate plans to dynamically reach predefined sales or product promotion goals, the optimal plan determined by hierarchical reinforcement learning via a first learner and a second learner, the first leaner selecting the optimal plan and the second learner selecting an optimal action.

9. The non-transitory computer-readable storage medium of claim 8, wherein the conversation platform includes a natural language processing (NLP) module.

10. The non-transitory computer-readable storage medium of claim 8, wherein a plan and policy management module combines information from the plan database and the industry database to generate the plurality of candidate plans.

11. The non-transitory computer-readable storage medium of claim 8, wherein an executor module executes plans and actions to trigger the conversation platform to send the optimal plan to the user.

12. The non-transitory computer-readable storage medium of claim 8, wherein a criterion for selecting the optimal plan includes predefined cost values.

13. The non-transitory computer-readable storage medium of claim 12, wherein the predefined cost values are adjusted for each of the plurality of candidate plans by the hierarchical reinforcement learning.

14. The non-transitory computer-readable storage medium of claim 8, wherein the robot determines an optimal path that leads to the selection of the optimal plan from the plurality of candidate plans maximizing a predefined sales goal.

15. A system for enabling hierarchical conversational policy learning for sales strategy planning, the system comprising:
 a memory; and
 one or more processors in communication with the memory configured to:
  enable a user to have a conversation with a robot via a conversation platform;
  employ a plan database to store general plans used in the conversation;
  employ an industry database to store a plurality of candidate plans pertaining to sales promotions; and
  employ a plan and policy optimizer to enable the robot to dynamically select and output an optimal plan from the plurality of candidate plans to dynamically reach predefined sales or product promotion goals, the optimal plan determined by hierarchical reinforcement learning via a first learner and a second learner, the first leaner selecting the optimal plan and the second learner selecting an optimal action.

16. The system of claim 15, wherein a plan and policy management module combines information from the plan database and the industry database to generate the plurality of candidate plans.

17. The system of claim 15, wherein an executor module executes plans and actions to trigger the conversation platform to send the optimal plan to the user.

18. The system of claim 15, wherein a criterion for selecting the optimal plan includes predefined cost values.

19. The system of claim 18, wherein the predefined cost values are adjusted for each of the plurality of candidate plans by the hierarchical reinforcement learning.

20. The system of claim 15, wherein the robot determines an optimal path that leads to the selection of the optimal plan from the plurality of candidate plans maximizing a predefined sales goal.

* * * * *